US007612920B2

(12) United States Patent
Fujishige et al.

(10) Patent No.: US 7,612,920 B2
(45) Date of Patent: Nov. 3, 2009

(54) MULTIFUNCTION IMAGE FORMING APPARATUS AND DOCUMENT INFORMATION SEARCHING METHOD

(75) Inventors: Takezo Fujishige, Kanagawa (JP); Kiyoshi Kasatani, Kanagawa (JP); Yoshihiko Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 740 days.

(21) Appl. No.: 10/901,164

(22) Filed: Jul. 29, 2004

(65) Prior Publication Data

US 2005/0024674 A1 Feb. 3, 2005

(30) Foreign Application Priority Data

Jul. 30, 2003 (JP) ............................. 2003-203643

(51) Int. Cl.
*G06F 15/00* (2006.01)
(52) U.S. Cl. ................... 358/402; 358/1.15; 358/442; 358/403; 707/1; 707/100; 707/200
(58) Field of Classification Search ............... 358/1.15, 358/442, 402, 403, 1.14, 1.13; 707/1–10, 707/100–104.1, 200–206; 709/219; 705/27
See application file for complete search history.

(56) References Cited

U.S. PATENT DOCUMENTS

| | | | | |
|---|---|---|---|---|
| 6,100,995 A | * | 8/2000 | Itoh | 358/1.13 |
| 6,104,499 A | * | 8/2000 | Yamada | 358/1.15 |
| 6,544,295 B1 | * | 4/2003 | Bodnar | 709/219 |
| 6,563,598 B1 | * | 5/2003 | Johnson et al. | 358/1.15 |
| 6,724,495 B1 | * | 4/2004 | Morisaki | 358/1.15 |
| 6,831,752 B1 | * | 12/2004 | Matsuo | 358/1.13 |
| 6,903,840 B1 | * | 6/2005 | Maymin et al. | 358/1.15 |

(Continued)

FOREIGN PATENT DOCUMENTS

JP 04-359372 12/1992

(Continued)

OTHER PUBLICATIONS

Akito Umebayashi, et al. "Next-Generation Multifunction Peripheral and Hyper Document System", Matsushita Technical Journal, Japan, Matsushita Electric Industrial Co., Ltd., Oct. 18, 1998, vol. 44, No. 5, pp. 11-17.

*Primary Examiner*—Houshang Safaipour
*Assistant Examiner*—Henry Dahbour
(74) *Attorney, Agent, or Firm*—Oblon, Spivak, McClelland, Maier & Neustadt, L.L.P.

(57) ABSTRACT

A control unit of a multifunction image forming apparatus obtains document information concerning copied documents, scanner read documents, and e-mail documents, and stores the obtained document information to a storing unit of a document storing unit. The control unit counts usage frequency concerning each document stored in the document storing unit, and stores the information as usage frequency information. The control unit has the operator, who carries out document searching, input predetermined information. The control unit matches the input information, and determines whether the operator is an authorized person concerning the searched document. In a case where it is determined that the operator is a legitimate authorized person, the control unit displays the information of the documents stored in the document storing unit, in an order of high usage frequency, to a display unit of an input operation unit, based on the usage frequency information.

17 Claims, 6 Drawing Sheets

U.S. PATENT DOCUMENTS

| | | | |
|---|---|---|---|
| 7,042,590 B2 * | 5/2006 | Young | 358/1.15 |
| 7,068,260 B2 * | 6/2006 | Hill | 358/1.13 |
| 7,099,021 B2 * | 8/2006 | Oyanagi | 358/1.13 |
| 7,167,263 B2 * | 1/2007 | Takayama et al. | 358/1.15 |
| 7,212,304 B2 * | 5/2007 | McIntyre et al. | 358/1.15 |
| 2002/0116291 A1 * | 8/2002 | Grasso et al. | 705/27 |

FOREIGN PATENT DOCUMENTS

| | | |
|---|---|---|
| JP | 11-120202 | 4/1999 |
| JP | 2001-77998 | 3/2001 |
| JP | 2002-202870 | 7/2002 |

* cited by examiner

FIG. 3

USAGE FREQUENCY INFORMATION

| DOCUMENT NAME | USAGE FREQUENCY |
|---|---|
| xxxxxxx | xxx |
| xxxxxxx | xxx |
| xxxxxxx | xxx |
| ⋮ | ⋮ |

MULTIFUNCTION IMAGE FORMING APPARATUS AND DOCUMENT INFORMATION SEARCHING METHOD

BACKGROUND OF THE INVENTION

1. Field of the Invention

The present invention relates to a multifunction image forming apparatus which accumulates document information of copied documents, scanner read documents, and e-mail documents, etc., and searches the accumulated document information in accordance with operation of a user, and a document information searching method.

2. Description of the Related Art

Various document information is accumulated in a complex machine (multifunction image forming apparatus) which includes functions of a scanner, printer, and a facsimile, etc. In a case where a user of a complex machine searches requested document information from the document information accumulated in this kind of complex machine, for example, the user finds the requested document by operating a display of an operation unit of a complex machine, to sequentially select a lower classification category that the requested document information belongs to, from the higher classification category.

A method of searching document information will be described, by an example of a case where a user of a complex machine wants to display a contract document A1 that is accumulated by a structure of "contract management"—"license contract"—"license contract concerning customer A"—"contract document A1".

The user of the complex machine operates the display of the operation unit of the complex machine, and firstly, displays the category names "contract management", "report document management", etc., of the highest classification category names. Next, the user selects "contract management" from the classification category displayed on the display, and operates the display of the operation unit to display lower classification category names "license contract", "joint application contract", etc., of the category "contract management". Sequentially, the user selects "license contract" from the classification category displayed on the display, and operates the display of the operation unit to display lower classification category names "license contract concerning customer A", "license contract concerning customer B" etc., of the category "license contract". Next, the user selects "license contract concerning customer A" from the classification category displayed on the display, and operates the display of the operation unit to display lower classification category names "contract document A1", "contract document A2", etc., of the category "license contract concerning customer A". Then, by the user selecting "contract document A1" from the classification category displayed on the display, contract document A1 can be displayed on the display. In this way, to search the contract document A1 (the document of the lowest classification category), the user has to select the category and document many times, therefore, it takes a lot of trouble.

In Unexamined Japanese Patent Application KOKAI Publication No. 2001-77998, a complex machine including data document searching function, which can accumulate a sending document to a memory, and search a data document by a keyword, is disclosed. However, with this kind of complex machine, in a case where a user searches a data document, it takes a long time until the requested data document is displayed. Therefore, information that the user requests can not be rapidly obtained. Also, with this kind of complex machine, because anyone can search a data document, sufficient security management of document information can not be carried out.

SUMMARY OF THE INVENTION

The present invention has been made in consideration of the above, and an object of the present invention is to provide a multifunction image forming apparatus which can rapidly search requested document information form accumulated document information.

Another object of the present invention is to provide a multifunction image forming apparatus wherein only the person who has legitimate authority can carry out searching of a document.

To achieve the above objects, a multifunction image forming apparatus according to a first aspect of the present invention comprises:

a document storing unit which stores document information including at least one of, copied document, scanner read document, and e-mail document;

a usage frequency information storing unit which generates usage frequency information, by counting the usage frequency concerning each document stored in the document storing unit, and storing the generated usage frequency information;

an authorized person authentication information storing unit which stores authentication information concerning the authorized person who has legitimate authority for searching a document stored in the document storing unit;

an operator authentication information input unit which has the operator input authentication information concerning the operator, a determining unit which matches authentication information concerning the operator, obtained by the operator authentication information input unit, against authentication information concerning an authorized person stored in the authorized person authentication information storing unit, and determines whether the operator is an authorized person or not;

a searching unit which searches the documents stored in the document storing unit, in an order of high usage frequency, based on the usage frequency information, in a case where it is determined by the determining unit that the operator is an authorized person; and a displaying unit which displays information concerning documents searched by the searching unit, in an order of high usage frequency of the documents.

The multifunction image forming apparatus may further comprise a selection input unit which accepts selection input of a document that the operator requests, from the information concerning the documents displayed in the displaying unit, wherein the display unit may display document information selected in the selection input unit.

The multifunction image forming apparatus may further comprise a FAX sending unit which faxes an arbitrary document to a designated destination, wherein the FAX sending unit may fax the document selected in the selection input unit.

The multifunction image forming apparatus may further comprise an e-mail sending unit which sends an e-mail of an arbitrary document to a designated destination, wherein the e-mail sending unit may send an e-mail of the document selected in the selection input unit.

The authentication information stored in the authorized person authentication information storing unit, may be at least one of, identification information of a code and password, fingerprint information, voice information, and iris information, and the operator authentication information input unit may have the operator input authentication information corresponding to authentication information stored in the authorized person authentication information storing unit.

The document storing unit may store an arbitrary level set to each document, the authorized person authentication information storing unit may store an arbitrary level set according to each authorized person, the determining unit may obtain a level value set to an operator, in a case where it is determined that the operator is a legitimate authorized person, and the searching unit may search information of documents having a level value corresponding to the level value of the operator, obtained by the determining unit.

A multifunction image forming apparatus according to a second aspect of the present invention is connected by one or a plurality of operation units that comprise a wireless LAN receiving/transmitting device and a wireless LAN, wherein:

authentication of an operator is carried out by inputting predetermined operator information concerning the operator, from the operation unit; and documents that are accumulated and stored in a predetermined storing unit is displayed in a list in an order of high usage frequency, in a case where the authentication result is correct.

The operator information may include at least one of, identification information of a code and password, fingerprint information, voice information, and iris information.

A document information searching method according to a third aspect of the present invention comprises:

a document storing step of storing document information including at least one of, copied document, scanner read document, and e-mail document;

a usage frequency information storing step of generating usage frequency information, by counting the usage frequency concerning each document stored in the document storing step, and storing the generated usage frequency information;

an authorized person authentication information storing step of storing authentication information concerning the authorized person who has legitimate authority for searching a document stored in the document storing step;

an operator authentication information input step of having the operator input authentication information concerning the operator;

a determining step of matching authentication information concerning the operator, obtained by the operator authentication information input step, against authentication information concerning an authorized person stored in the authorized person authentication information storing step, and determining whether the operator is an authorized person or not;

a searching step of searching the documents stored in the document storing step, in an order of high usage frequency, based on the usage frequency information, in a case where it is determined by the determining step that the operator is an authorized person; and a displaying step of displaying information concerning documents searched by the searching step, in an order of high usage frequency of the documents.

The document information searching method may further comprise a selection input step of accepting selection input of a document that the operator requests, from the information concerning the documents displayed in the displaying step, wherein the display step may display document information selected in the selection input step.

The document information searching method may further comprise a FAX sending step of faxing an arbitrary document to a designated destination, wherein the FAX sending step may fax the document selected in the selection input step.

The document information searching method may further comprise an e-mail sending step of sending an e-mail of an arbitrary document to a designated destination, wherein the e-mail sending step may send an e-mail of the document selected in the selection input step.

The authentication information stored in the authorized person authentication information storing step, may be at least one of, identification information of a code and password, fingerprint information, voice information, and iris information, and the operator authentication information input step may have the operator input authentication information corresponding to authentication information stored in the authorized person authentication information storing step.

The document storing step may store an arbitrary level set to each document, the authorized person authentication information storing step may store an arbitrary level set according to each authorized person, the determining step may obtain a level value set to an operator, in a case where it is determined that the operator is a legitimate authorized person, and the searching step may search information of documents having a level value corresponding to the level value of the operator, obtained by the determining step.

A computer readable recording medium according to a fourth aspect of the present invention, stores a program for controlling a computer to execute:

a document storing step of storing document information including at least one of, copied document, scanner read document, and e-mail document;

a usage frequency information storing step of generating usage frequency information, by counting the usage frequency concerning each document stored in the document storing step, and storing the generated usage frequency information;

an authorized person authentication information storing step of storing authentication information concerning the authorized person who has legitimate authority for searching a document stored in the document storing step;

an operator authentication information input step of having the operator input authentication information concerning the operator;

a determining step of matching authentication information concerning the operator, obtained by the operator authentication information input step, against authentication information concerning an authorized person stored in the authorized person authentication information storing step, and determining whether the operator is an authorized person or not;

a searching step of searching the documents stored in the document storing step, in an order of high usage frequency, based on the usage frequency information, in a case where it is determined by the determining step that the operator is an authorized person; and a displaying step of displaying information concerning documents searched by the searching step, in an order of high usage frequency of the documents.

A computer data signal embedded in a carrier wave according to a fifth aspect of the present invention, represents a program for controlling a computer to execute:

a document storing step of storing document information including at least one of, copied document, scanner read document, and e-mail document;

a usage frequency information storing step of generating usage frequency information, by counting the usage frequency concerning each document stored in the document storing step, and storing the generated usage frequency information;

an authorized person authentication information storing step of storing authentication information concerning the authorized person who has legitimate authority for searching a document stored in the document storing step;

an operator authentication information input step of having the operator input authentication information concerning the operator;

a determining step of matching authentication information concerning the operator, obtained by the operator authentication information input step, against authentication information concerning an authorized person stored in the authorized person authentication information storing step, and determining whether the operator is an authorized person or not;

a searching step of searching the documents stored in the document storing step, in an order of high usage frequency, based on the usage frequency information, in a case where it is determined by the determining step that the operator is an authorized person; and a displaying step of displaying information concerning documents searched by the searching step, in an order of high usage frequency of the documents.

BRIEF DESCRIPTION OF THE DRAWINGS

These objects and other objects and advantages of the present invention will become more apparent upon reading of the following detailed description and the accompanying drawings in which:

FIG. 3 is a diagram showing data structure of usage frequency information;

DETAILED DESCRIPTION OF THE PREFERRED EMBODIMENT

A multifunction image forming apparatus according to an embodiment of the present invention will be described with reference to the drawings.

Figure 1:
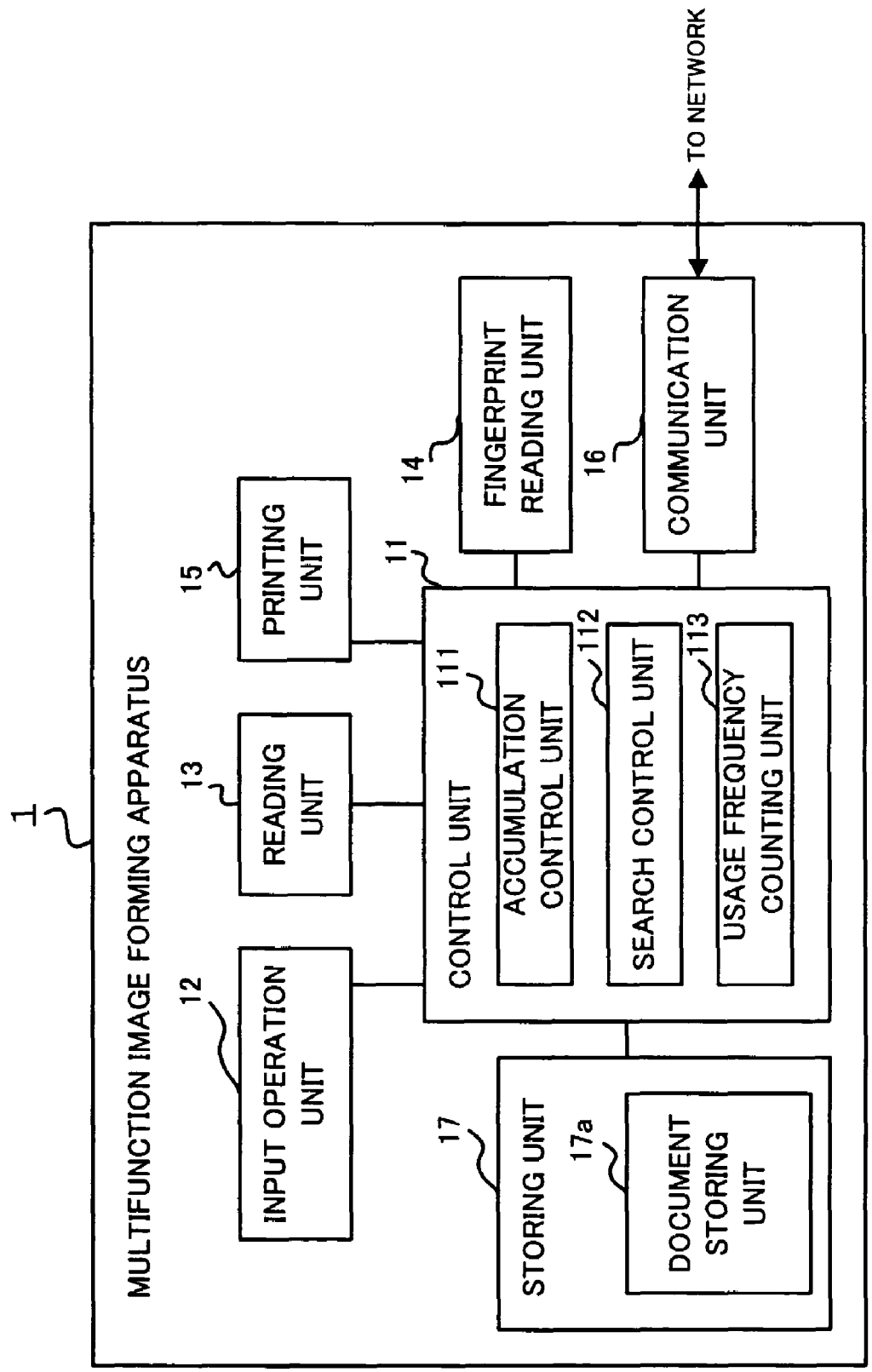
FIG. 1 is a diagram showing an example of a structure of a multifunction image forming apparatus according to an embodiment of the present invention.
Figure 2:
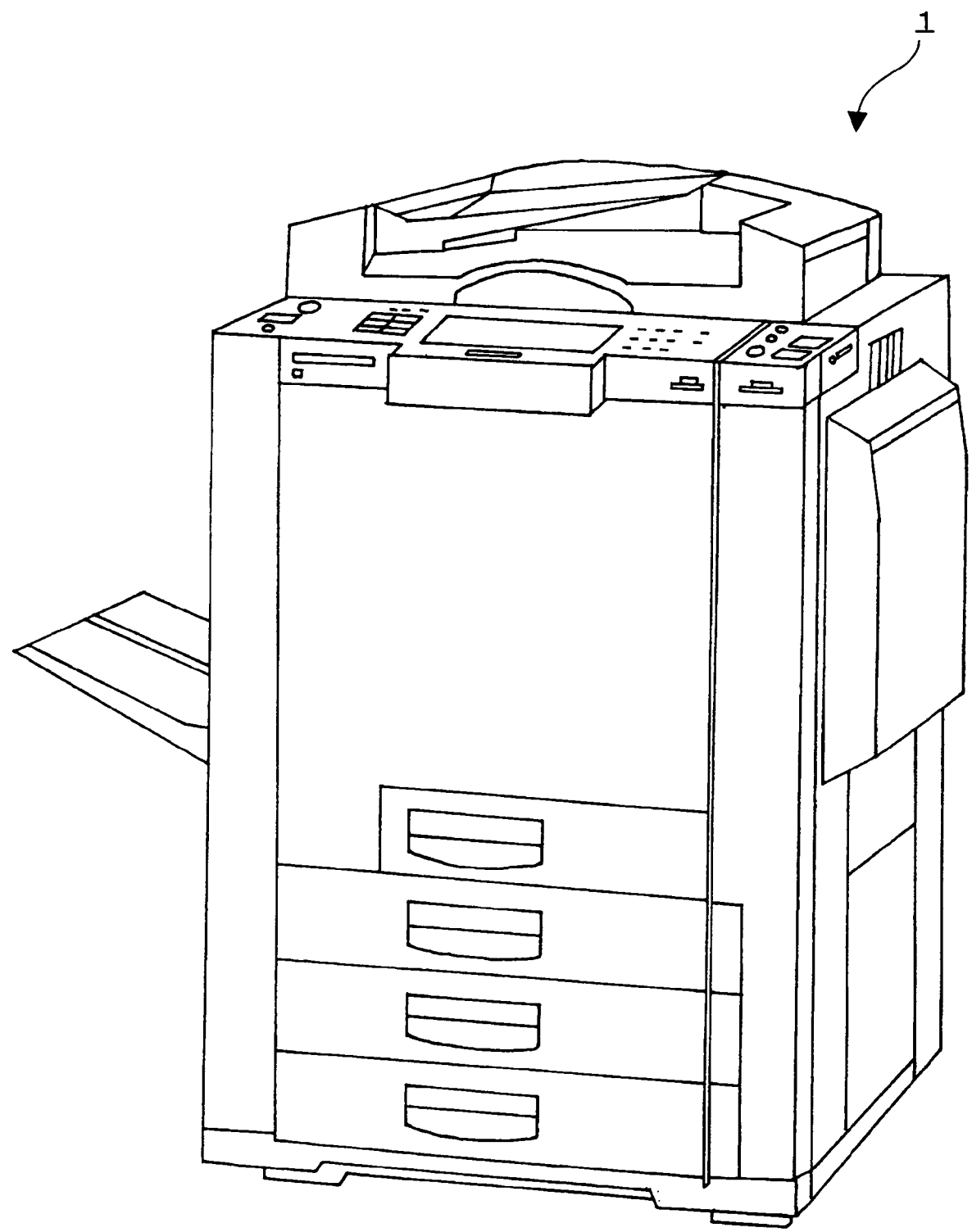
FIG. 2 is a diagram showing an example of an exterior view of the multifunction image forming apparatus according to the embodiment of the present invention.

FIG. 1 shows an example of a structure of a multifunction image forming apparatus according to an embodiment of the present invention. FIG. 2 shows an example of an exterior view of the multifunction image forming apparatus.

The multifunction image forming apparatus 1 is a complex machine that has a copying function, a scanning function, and an e-mail sending function, and comprises for example, a control unit 11, an input operation unit 12, a reading unit 13, a fingerprint reading unit 14, a printing unit 15, a communication unit 16, and a storing unit 17, etc.

The control unit 11 is constituted by a CPU (Central Processing Unit), a ROM (Read Only Memory), and a RAM (Random Access Memory), etc., and controls the entirety of the present apparatus. By reading and executing an operation program, etc., that is stored in the storing unit 17 in advance, the control unit 11 realizes the later described accumulation control unit 111, search control unit 112, and usage frequency counting unit 113, etc.

The accumulation control unit 111 carries out processing for accumulating and storing document information of documents, etc., for example, image data (document data), that are copied, read by a scanner, and sent by e-mail, by an ordinary copying processing, scanner reading processing, and e-mail sending processing, etc., to a document storing unit 17a of the storing unit 17.

For example, based on the processing content, (copying processing, scanner reading processing, e-mail sending processing, etc.) that the multifunction image forming apparatus 1 executes, the accumulation control unit 111 accumulates and stores the document data accumulated and stored in the document storing unit 17a, according to the type of document (copied document, scanner read document, e-mail document, etc.). When the accumulation control unit 111 accumulates and stores the document data to the document storing unit 17a, the accumulation control unit 111 has the user input a document name of the document data, or automatically creates a document name of the document data. Then, the accumulation control unit 111 adds the document name that the user inputs, or the document name that is automatically created, to the document data, as a file name of the document data. The document data accumulated and stored in the document storing unit 17a is read by a later described document searching processing, and re-used (FAX sending, e-mail sending, etc.).

The accumulation control unit 111 (usage frequency information storing unit) generates usage frequency information concerning the document data accumulated and stored in the document storing unit 17a, and stores the information to the document storing unit 17a. As exemplified in FIG. 3, the usage frequency information includes information such as, document name (file name) and usage frequency (initial value: 0), etc. The number of times (usage frequency) that the document data is used for copying (printing), e-mail sending, etc., is stored in the document storing unit 17a, according to each document name. The value of the usage frequency, is added by 1, when a document data is used.

The search control unit 112 (determining unit, searching unit) carries out authentication of an operator, in accordance with a predetermined input operation by a user (operator) who requests document searching, and carries out document searching processing of searching/displaying a document that is accumulated and stored.

In the authentication of the operator, it is determined whether the operator who requested searching of a document, is a legitimate authorized person to request searching. For example, the search control unit 112 carries out authentication of an operator by a code and password, and image data (finger print data) of fingerprints. In the authentication of an operator by a code and password, the search control unit 112 accepts input of a code and password from the operator, and determines whether the accepted code and password match with the code and password that are stored in the storing unit 17 in advance. Then, in a case where it is determined that the codes and passwords match, the search control unit 112 carries out authentication of the operator by fingerprint data. In the authentication of the operator by fingerprint data, the search control unit 112 obtains fingerprint data of the fingerprint of the operator from the fingerprint reading unit 14, and matches the obtained fingerprint data against fingerprint data of the person who has the authority to display the document data (authorized person), which is stored in the storing unit 17 in advance. In a case where the fingerprint data match, the search control unit 112 determines that the operator is a legitimate authorized person. In a case where the codes and passwords do not match, or in a case where the fingerprint data do not match, the search control unit 112 determines that the operator is not a legitimate authorized person.

In a case where it is determined that the operator is a legitimate authorized person, the search control unit 112 executes document searching processing. In the document searching processing, for example, the search control unit 112 searches document data accumulated and stored in the storing unit 17, in an order of high usage frequency, and displays the file name, etc., of the document data on the display of the input operation unit 12.

Concretely, first, the search control unit 112 reads the usage frequency information stored in the storing unit 17, compares the values of the usage frequency of each document, and sorts the document data in an order of high usage frequency. Then, the search control unit 112 displays a list of the file names, etc., of the document data on the display of the input operation unit 12, in accordance with the order that the sorted results indicate. In a case where an input operation of selecting a file name from the file names, etc., displayed on the display of the input operation unit 12, is carried out by an operator, the search control unit 112 searches the selected file name, etc., reads the document data from the document storing unit 17, and displays it on the input operation unit 12.

In a case where input operation of instructing FAX sending is carried out by an operator, in a state where document data is displayed on the input operation unit 12, the search control unit 112 accepts input concerning the destination of the document that is to be faxed (FAX number, etc., of the sending destination). Then, the control unit 11 starts a program (FAX sending application) for realizing FAX sending, and faxes the displayed document to the input destination.

In a case where input operation of instructing e-mail sending is carried out by an operator by pressing an e-mail sending button, etc., in a state where document data is displayed on the input operation unit 12, the search control unit 112 accepts input concerning the destination of the document (e-mail address, etc.). Then, the control unit 11 starts a program (e-mail sending application) for realizing e-mail sending, and sends the displayed document to the input destination, by e-mail.

The usage frequency counting unit 113 carries out processing of counting the usage frequency (the number of times used) of the copied document, the document that is read by a scanner, and the document that is sent by e-mail, etc. Concretely, in a case where copying processing, scanner reading processing, and FAX sending processing, etc., is carried out, based on the document name of the document data that is a processing target, the usage frequency counting unit 113 counts up the value of the usage frequency of the corresponding document.

In a case where ordinary copying processing, scanner reading processing, and e-mail sending processing are carried out, the usage frequency counting unit 113 obtains data of document name, etc., added to the document data by the accumulation control unit 111. In a case where copying processing and e-mail sending processing, etc., are carried out concerning the document that is searched/displayed by the document searching processing, the usage frequency counting unit 113 obtains data of document name, etc., of the document data that is the processing target, from the search control unit 112.

By reading and executing various programs stored in the storing unit 17, the control unit 11 controls the reading unit 13, the printing unit 15, and the communication unit 16, etc. Also, the control unit 11 realizes various functions, such as a copying function, facsimile function (as a FAX sending unit), and e-mail sending function (as an e-mail sending unit), etc.

The input operation unit 12 comprises for example, an input unit (operator authentication information input unit, and selection input unit), such as input keys, etc., and a display unit such as a liquid crystal display, etc. The input operation unit 12 displays various information, etc., in accordance with instructions from the control unit 11. The input operation unit 12 supplies the data input by the input unit to the control unit 11.

The reading unit 13 is constituted by a scanner, etc., and reads images by optically scanning manuscripts such as documents and drawings, etc., in accordance with instructions from the control unit 11. The reading unit 13 converts the read image to image information.

The fingerprint reading unit 14 is constituted by a fingerprint sensor, etc., and generates image information of fingerprints, by reading fingerprints, in accordance with instructions from the control unit 11. The fingerprint reading unit 14 supplies the generated image data (fingerprint data) of the fingerprint to the control unit 11.

The printing unit 15 prints image information, etc., to a paper, in accordance with instructions from the control unit 11.

The communication unit 16 is constituted by a communication device, etc., which is connected to a network, such as the Internet and a public line network, etc., and sends/receives data of the image information, etc.

The storing unit 17 is constituted by a hard disk, and a DVD-RAM, etc., and comprises a document storing unit 17a wherein copied documents, scanner read documents, and e-mail documents are accumulated and stored according to the type of document The document storing unit 17a comprises for example, a copied document storing unit wherein copied documents are accumulated, a scanner read document storing unit wherein scanner read documents are stored, and an e-mail document storing unit wherein e-mail documents are stored, etc.

The storing unit 17 stores various operation programs for the control unit 11 to execute, usage frequency information (refer to FIG. 3), and various data, etc., necessary for processing. Also, the storing unit 17 (authorized person authentication information storing unit) stores codes and passwords used in the authentication processing, and finger print data, etc., of a person who has the authority (authorized person) to carry out document searching.

Next, system operation of the multifunction image forming apparatus 1 according to the embodiment of the present invention will be described.

Figure 4:
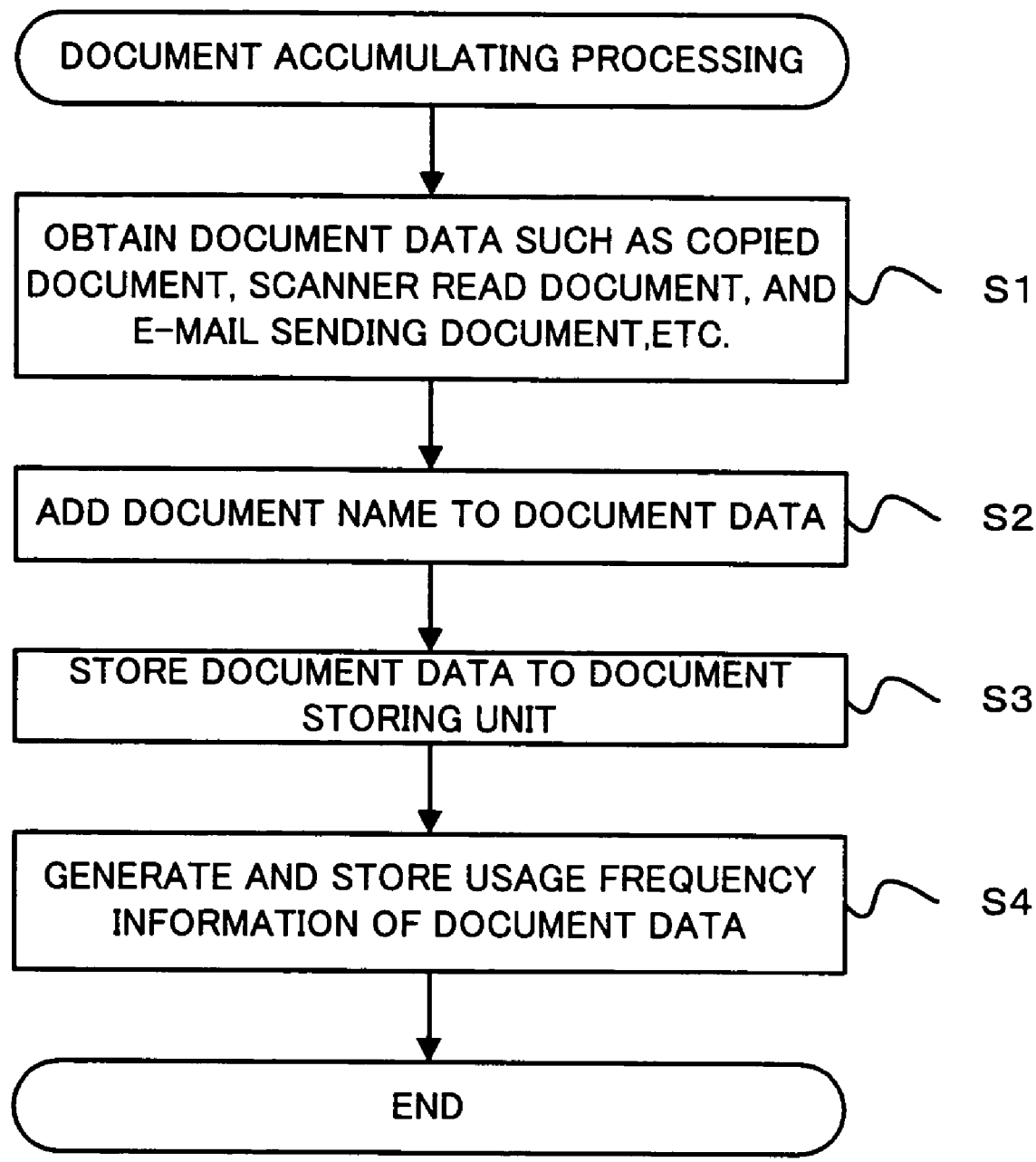
FIG. 4 is a flowchart of document accumulating processing.

First, document accumulating processing wherein the control unit 11 accumulates and stores the copied document, the document read by a scanner, and the document sent by e-mail, etc., to the storing unit 17, will be described with reference to the flowchart shown in FIG. 4.

The control unit 11 (accumulation control unit 111) of the multifunction image forming apparatus 1 obtains document data of a processing target in each processing, in accordance with ordinary copying processing, scanner reading processing, and e-mail sending processing being executed (step S1). After obtaining the document data, the control unit 11 (accumulation control unit 111) has the user input the document name of the document data, or the accumulation control unit 111 automatically generates a document name, and adds it to the document data as a file name (step S2). Then, the control unit 11 (accumulation control unit 111) stores the document data that has a document name added to the document storing unit 17a (step S3).

Here, the accumulation control unit 111 may determine the storing destination of the document in the document storing unit 17a, based on each processing content (copying processing, scanner reading processing, e-mail sending processing), that is executed. In this case, for example, when a copying processing is executed, the accumulation control unit 111 stores the document data that is a processing target, to a copied document storing unit in the document storing unit 17a. When a scanner reading processing is executed, the accumulation control unit 111 stores the document data that is a processing target, to a scanner read document storing unit in the document storing unit 17a When an e-mail sending processing is executed, the accumulation control unit 111 stores the document data that is a processing target, to an e-mail document storing unit in the document storing unit 17a.

Then, the control unit 11 (accumulation control unit 111) generates usage frequency information exemplified in FIG. 3, concerning document data that is stored, stores it to the storing unit 17 (step S4), and ends the present processing.

Figure 5:
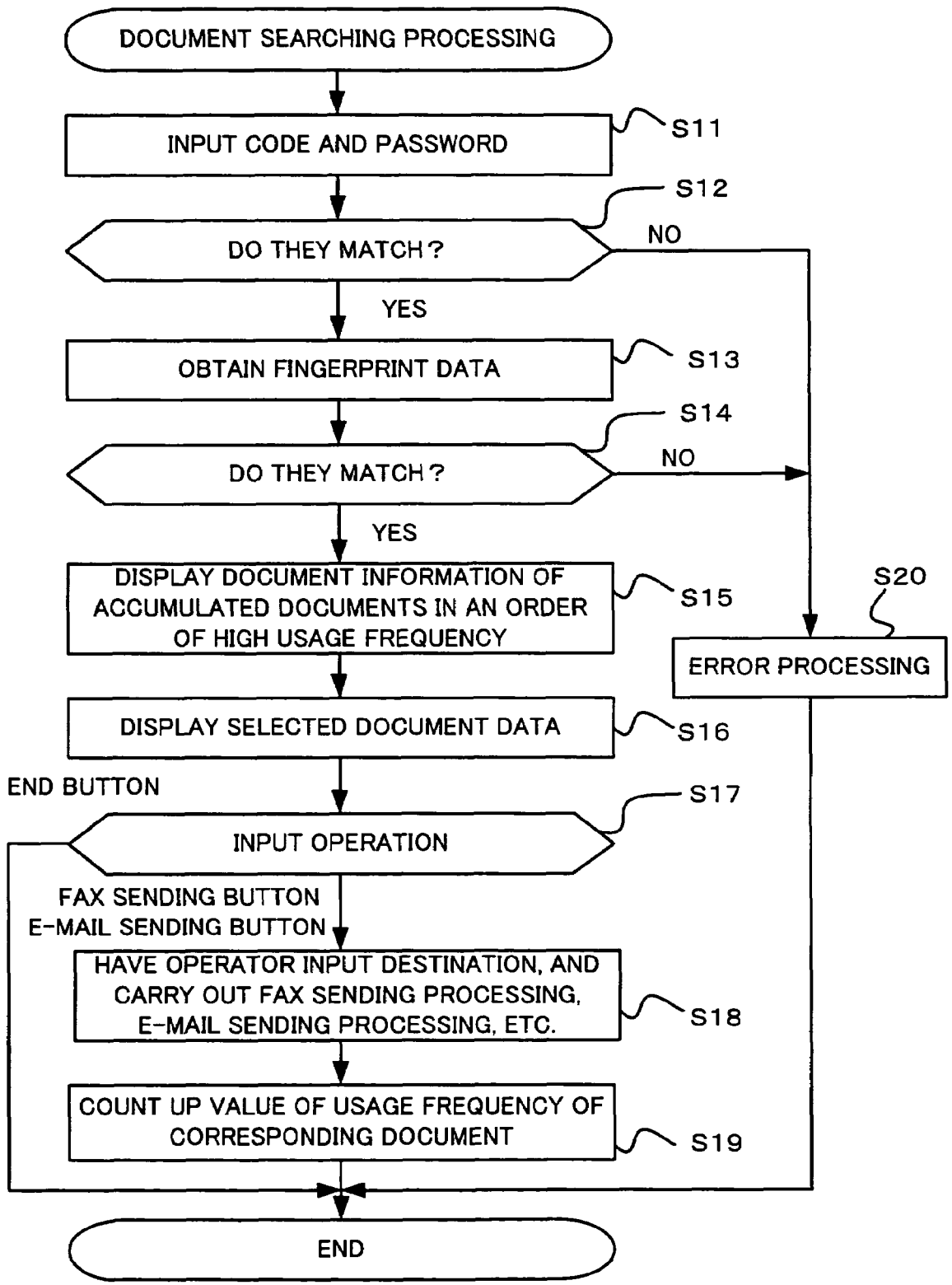
FIG. 5 is a flowchart of document searching processing.

Next, document searching processing for searching/displaying a document that a user (operator) requests, from the document, etc., stored in the storing unit 17 by the above described document accumulation processing, will be described with reference to the flowchart shown in FIG. 5. In the document searching processing, the control unit 11 (search control unit 112) determines whether the operator who requested searching of a document is a legitimate authorized person or not, and in a case where the operator is a legitimate authorized person, carries out searching of the document that the operator requested.

In order to carry out authentication of an operator, first, the control unit 11 (search control unit 112) accepts for example, input of a code and password, in accordance with a predetermined input operation for requesting document searching by the operator (step S11). Then, the search control unit 112 determines whether the code and password input by the input operation unit 12 match with the code and password that are registered in the storing unit 17 in advance (step S12).

In a case where it is determined that the codes and passwords match, (step S12; YES), the search control unit 112 obtains image data (fingerprint data) of the operator, via the fingerprint obtaining unit 14 (step S13). The search control unit 112 matches the obtained fingerprint data against the fingerprint data of an authorized person of document searching registered in the storing unit 17 in advance, and determines whether the fingerprint data match or not (step S14).

In a case where it is determined that the fingerprint data match, (step S14; YES), the search control unit 112 reads the usage frequency information of the documents, etc., accumulated and stored in the storing unit 17. Then, the search control unit 112 compares the usage frequency of the usage frequency information of each read document data, and sorts the documents in an order of high usage frequency. The search control unit 112 displays the file names, etc., of document data on the display of the input operation unit 12, in an order of high usage frequency (step S15). In a case where the data can not be displayed in one screen, the data can be displayed divided into a few pages. For example, the display can be sequentially changed in accordance with a "next page displaying button" being pressed, etc. Because document names, etc., are displayed in an order of high usage frequency, when searching an accumulated document, the more the document is used, the more likely it is for the user to find that document. Therefore, comprehensively rapid searching becomes possible.

When an input operation of selecting a document from the documents that are displayed is carried out, the control unit 11 reads document data such as the selected document name, etc., from the document storing unit 17a of the storing unit 17, and displays it on the display of the input operation unit 12 (step S116). By the operator pressing a FAX button or an e-mail sending button, in a state where document data is displayed on the display of the input operation unit 12, the displayed document can be faxed or e-mailed.

In a case where the FAX button or the e-mail sending button is pressed, in a state where document data is displayed, (step S17: pressing e-mail sending button, FAX sending button, etc.), the control unit 11 accepts input concerning the sending destination of the document (FAX number, e-mail address, etc.), which is necessary for sending. Then, the control unit 11 starts a corresponding application (FAX sending application, e-mail sending application, etc.), and sends the document (data) of the displayed document to the input sending destination (step S18). Further, the control unit 11 adds 1 to the value of usage frequency in the usage frequency information of the corresponding document, (step S19), and ends the present processing. In a case where an end button, etc., is pressed, in a state where document data is displayed, (step S17: press end button), the present processing ends.

In steps S12 and S14, in a case where the control unit 11 determines that the matched data do not match, (step S12; No, Step S14; No), it determines that the operator is not a person who has legitimate authority, and carries out a predetermined error processing, such as outputting (displaying, etc.) a message indicating that document searching operation will not be permitted (step S20). In this way, people who do not have legitimate authority can not carry out document searching. Therefore, important documents, etc., are not seen by people who are not authorized, and unauthorized access and tampering of documents, etc. can be prevented. As a result, overall safety of the system can be enforced.

As described above, according to the present invention, when searching an accumulated document, an operator can select a requested document by displaying document name, etc., in an order of high usage frequency. By this, the documents that are used more frequently can be found more easily by the users, and rapid searching can be comprehensively carried out. Also, by carrying out authentication of the operator, because only the people who have legitimate authority can search/browse documents, security management of document data can be carried out. Namely, people who do not have legitimate authority can not search/browse, etc., document data. Therefore, for example, important documents, etc., are not seen by people who are not authorized, and unauthorized access and tampering of documents, etc. can be prevented. As a result, overall safety of the system can be enforced.

Figure 6:
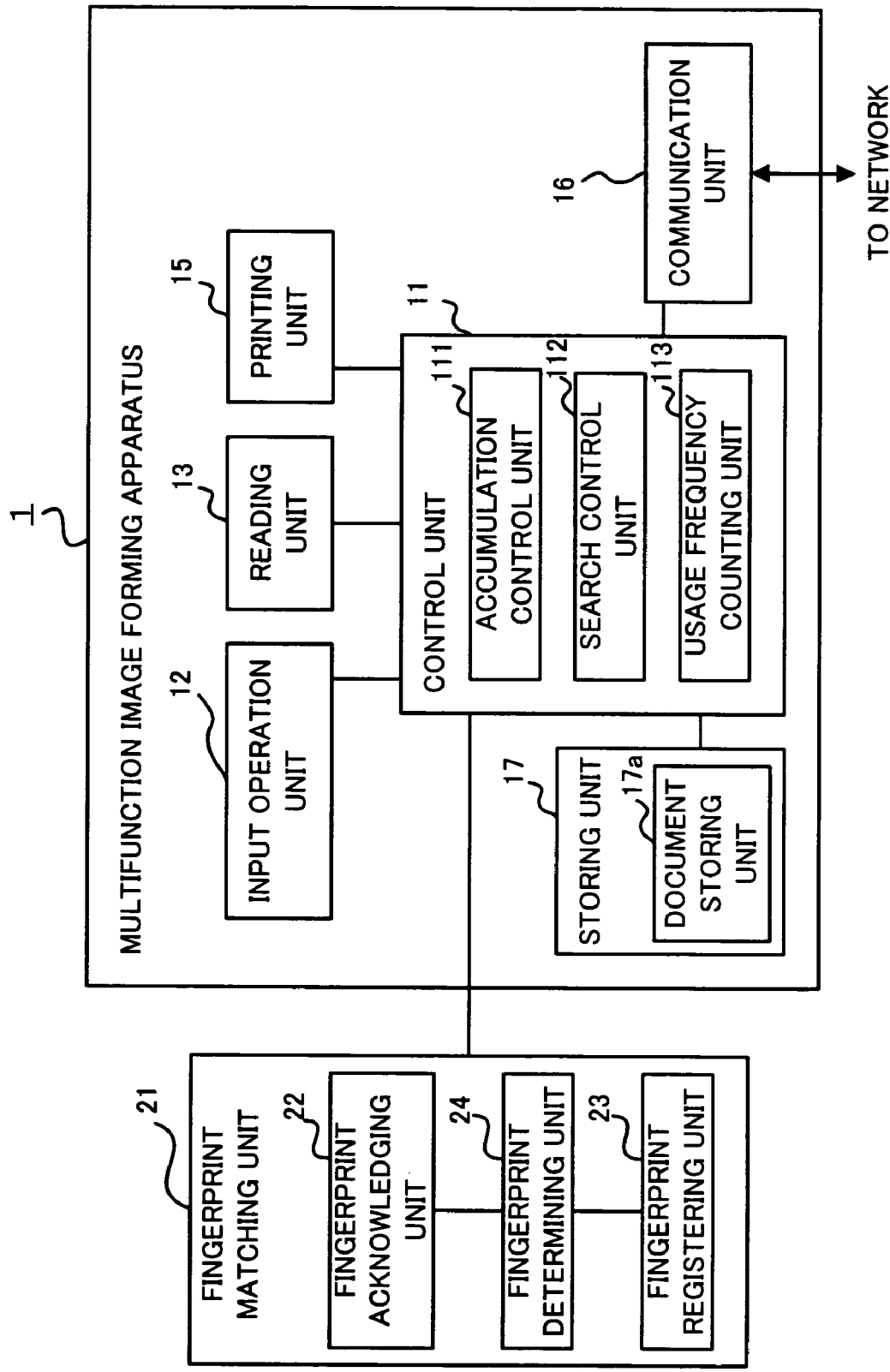
FIG. 6 is a diagram showing an example of a structure of the multifunction image forming apparatus, in a case where it comprises a fingerprint matching unit.

In the above embodiment, authentication of the read fingerprint is carried out by the fingerprint reading unit 14 and the search control unit 112. However, it is not limited to this, and for example, as shown in FIG. 6, a fingerprint matching unit 21 (fingerprint matching device) can be separately connected to the multifunction image forming apparatus 1. The fingerprint matching unit 21 can be constituted by for example, a fingerprint acknowledging unit 22, a fingerprint registering unit 23, and a fingerprint determining unit 24. The fingerprint acknowledging unit 22 reads fingerprints, and obtains fingerprint data Fingerprint data of authorized people are registered in the fingerprint registering unit 23. The fingerprint determining unit 24 determines whether the fingerprint data that the fingerprint acknowledging unit 22 read, and the fingerprint data registered in the fingerprint registering unit 23 are the same or not. The fingerprint matching unit 21 is connected by the multifunction image forming apparatus 1 and a wireless LAN, or by a fixed line, and sends the determination result to the control unit 11. This kind of fingerprint matching unit 21 can carry out fingerprint matching.

The input operation unit 12 may be structured so that it is connected to the control unit 11 by a wireless LAN, and can be attached and detached from the present apparatus. In this case, the input operation unit 12 may comprise the fingerprint reading unit 14.

In the above embodiment, matching of a code and password, and fingerprint matching are carried out in the authentication processing of the operator. However, the authentication method for authenticating the operator is not limited to this method. For example, instead of fingerprint matching, or together with fingerprint matching, voice matching and iris matching may be carried out.

In a case where voice matching is adopted, the multifunction image forming apparatus 1 further comprises a voice input unit which is constituted by a microphone, etc. The multifunction image forming apparatus 1 stores voice data of a predetermined keyword of the authorized person in the storing unit 17, in advance. In this case, for example, voice input of the predetermined keyword by the order applicant (operator) is accepted by the voice input unit. Then, the control unit 11 matches the voice data obtained by carrying out a predetermined conversion processing (A/D conversion, etc.), concerning the input voice, against the voice data of the registered predetermined keyword. The control unit 11 may determine that the operator is a legitimate authorized person, by whether the voice data match or not.

In a case where iris matching is adopted, the multifunction image forming apparatus 1 further comprises an iris acknowledging unit such as a camera, etc. The multifunction image forming apparatus 1 registers image information of the iris of the authorized person to the storing unit 17, in advance. In this case, image information of the iris (iris data) is obtained by for example, imaging, etc., the iris of the order applicant (operator). Then, the control unit 11 matches the image information against the image information of the iris that is registered in advance. It may be determined that the operator is a legitimate authorized person, by whether the image information of the iris match or not An operation unit which comprises at least one of the voice input unit, the fingerprint reading unit 14, and the iris acknowledging unit may be connected via the multifunction image forming apparatus 1 and a wireless LAN. In this case, each operation unit (including the input operation unit 12) comprises an un-illustrated wireless LAN receiving/transmitting device and a wireless LAN.

In the document searching processing, information such as file name, etc., is displayed in an order of high usage frequency. However, it can be switched to a search display according to the hierarchy structure of document categories, in accordance with, for example, the operator pressing a predetermined button. In this case, the operator sequentially selects the upper classification category to the lower category, using hierarchy structure information indicating the hierarchy structure of the document in classification categories, and classification category information wherein at least the lowest classification category, etc., concerning each document is set.

In a case where the lowest classification category is selected by the operator, the control unit 11 may display the document name that belongs to that category, read the document data of the file selected from that category, from the document storing unit 17a, and display the document data.

Authority of the authorized person who searches documents and levels of document data may be set. For example, the level of authority and document data are classified by A, B, and C. It is assumed that level A has the highest authority and is the highest confidential document, and authority and confidentiality become lower in the order of level B to level C. The authorized person of level A can search every document data (level A, B, and C). The authorized person of level B can search document data of level B and C. However, the authorized person of level B can not search document data of level A. The authorized person of level C can search only the document data of level C. In this case, the control unit 11 controls the storing unit 17 to store information indicating the ranking of authority, correlated with the authorized person and document data. In the determining processing of authenticating the operator of the document searching processing, the control unit 11 determines by reading the information indicating the ranking of authority. The control unit 11 stores in advance, a program that can execute this kind of function.

Also, authentication using only a code or a password can be carried out. In this case, it is preferable that the control unit 11 stores in advance, a program that can search only the documents that are not so confidential. By this, comprehensive security management of document data can be carried out.

In the document searching processing, in a case where the copy button is pressed at a predetermined timing (for example, in a state where a list of document names is displayed in an order of high usage frequency), the document names may be displayed in an order of high usage frequency, limiting the displayed documents to copying documents. In a case where the scanner reading button is pressed, the document names may be displayed in an order of high usage frequency, limiting the displayed documents to scanner read documents. In a case where the e-mail button is pressed, the document names may be displayed in an order of high usage frequency, limiting the displayed documents to e-mail documents. In these cases, the accumulation control unit 111 may generate usage frequency information including identification information of the documents, such as for example, document name, usage frequency, type of document (copied document, scanner read document, e-mail document, etc.), etc., and store it to the storing unit 17.

A program for executing the operation of the above embodiment may be stored in a computer readable recording medium (FD, CD-ROM, DVD, etc.) and distributed, and the program may be installed to the multifunction image forming apparatus 1. Or, the program for executing the operation of the above embodiment may be stored in a disk device that a server device in a network comprises, such as the Internet, etc., and may be downloaded, etc., to the multifunction image forming apparatus 1, by for example, embedding the program on a carrier wave.

In a case where a part of each of the above functions is realized by an OS, or each of the above functions is realized together with an application, parts other than the OS may be stored in a medium and distributed, or the program may be embedded in a carrier wave, and downloaded, etc., to a computer.

According to the present invention, in a multifunction image forming apparatus, it is possible to rapidly search information of a requested document from the accumulated documents. Also, security of the document data accumulated in the multifunction image forming apparatus can be comprehensively enforced.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment Various modifications made within the meaning of an equivalent of the claims of the invention and within the claims are to be regarded to be in the scope of the present invention.

This application is based on Japanese Patent Application No. 2003-203643 filed on Jul. 30, 2003, and including specification, claims, drawings and summary. The disclosure of the above Japanese Patent Application is incorporated herein by reference in its entirety.

What is claimed is:

1. A multifunction image forming apparatus comprising:
    a document storing unit which stores document information including at least one of a copied document, a scanner read document, and an e-mailed document;
    a usage frequency information storing unit which stores usage frequency information of the documents which are stored;
    an authorized person authentication information storing unit which stores authentication information concerning the authorized person who has authority for searching a document stored in said document storing unit;
    an operator authentication information input unit configured to input authentication information concerning the operator;
    a determining unit which matches authentication information concerning the operator, obtained by said operator authentication information input unit, against authentication information concerning an authorized person stored in said authorized person authentication information storing unit, and determines whether the operator is an authorized person;
    a searching unit which searches the usage frequency information, in a case where it is determined by said determining unit that the operator is an authorized person; and
    a displaying unit which displays information concerning documents searched by said searching unit, in an order of high usage frequency of the documents.

2. The multifunction image forming apparatus according to claim 1, further comprising a selection input unit which accepts selection input of a document that the operator requests, from the information concerning the documents displayed in said displaying unit, wherein
    said display unit displays document information selected in said selection input unit.

3. The multifunction image forming apparatus according to claim 2, further comprising a FAX sending unit configured to fax the document selected by said selection input unit to a designated destination.

4. The multifunction image forming apparatus according to claim 2, further comprising an e-mail sending unit configured to send an e-mail including a document selected by said selection input unit to a designated destination.

5. The multifunction image forming apparatus according to claim 1, wherein:
    said authentication information stored in said authorized person authentication information storing unit is at least one of identification information of a code and password, fingerprint information, voice information, and iris information, and
    said operator authentication information input unit is configured to store the operator input authentication information corresponding to authentication information in said authorized person authentication information storing unit.

6. The multifunction image forming apparatus according to claim 1, wherein:
    said document storing unit stores a level of the documents;
    said authorized person authentication information storing unit stores a level of authorized persons;
    said determining unit obtains a level of an operator, in a case where it is determined that the operator is an authorized person; and
    said searching unit searches information of documents having a level corresponding to the level of the operator, obtained by the determining unit.

7. The multifunction image forming apparatus according to claim 1, further comprising:
    an input unit configured to receive a user selection of a type of document;
    a search control unit configured to control the display unit to display the document information of the documents in accordance with the user selection of the type of document such that only one of copied documents, scanner read documents, and e-mail documents are displayed by the display unit.

8. A document information searching method for use with a document information searching system, comprising:
    a document storing step of storing, by the document information searching system, document information including at least one of a copied document, a scanner read document, and an e-mailed document;
    a usage frequency information storing step which stores, by the document information searching system, usage frequency information of the documents which are stored;
    an authorized person authentication information storing step of storing, by the document information searching system, authentication information concerning the authorized person who has authority for searching a document stored in said document storing step;
    an operator authentication information input step which inputs, by the document information searching system, authentication information concerning the operator;
    a determining step of matching, by the document information searching system, authentication information concerning the operator, obtained by said operator authentication information input step, against authentication information concerning an authorized person stored in said authorized person authentication information storing step, and determining whether the operator is an authorized person;
    a searching step of searching, by the document information searching system, the usage frequency information in a case where it is determined by said determining step that the operator is an authorized person; and
    a displaying step of displaying, by the document information searching system, information concerning documents searched by said searching step, in an order of high usage frequency of the documents.

9. The document information searching method according to claim 8, further comprising a selection input step of accepting, by the document information searching system, selection input of a document that the operator requests, from the information concerning the documents displayed in said displaying step, wherein
said displaying step displays document information selected in said selection input step.

10. The document information searching method according to claim 9, further comprising a FAX sending step of faxing, by the document information searching system, the document selected in said selection input step to a designated destination.

11. The document information searching method according to claim 9, further comprising an e-mail sending step of sending, by the document information searching system, an e-mail including a document to a designated destination, wherein said e-mail sending step sends an e-mail including the document selected by said selection input step.

12. The document information searching method according to claim 8, wherein:
said authentication information stored in said authorized person authentication information storing step is at least one of identification information of a code and password, fingerprint information, voice information, and iris information, and
said operator authentication information input step inputs, by the document information searching system, authentication information corresponding to authentication information which is stored in said authorized person authentication information storing step.

13. The document information searching method according to claim 8, wherein:
said document storing step stores, by the document information searching system, a level of the documents;
said authorized person authentication information storing step stores, by the document information searching system, a level of authorized persons;
said determining step obtains, by the document information searching system, a level of an operator, in a case where it is determined that the operator is an authorized person; and
said searching step searches, by the document information searching system, information of documents having a level corresponding to the level of the operator, obtained by the determining step.

14. The method according to claim 8, further comprising:
receiving, by the document information searching system, a user selection of a type of document,
wherein the displaying displays, by the document information searching system, the information concerning the documents in accordance with the user selection of the type of document such that only one of copied documents, scanner read documents, and e-mail documents are displayed by the displaying step.

15. A computer readable recording medium which stores a program for controlling a computer to execute:
a document storing step of storing document information including at least one of a copied document, a scanner read document, and an e-mailed document;
a usage frequency information storing step which stores usage frequency information of the documents which are stored;
an authorized person authentication information storing step of storing authentication information concerning the authorized person who has authority for searching a document stored in said document storing step;
an operator authentication information input step which inputs authentication information concerning the operator;
a determining step of matching authentication information concerning the operator, obtained by said operator authentication information input step, against authentication information concerning an authorized person stored in said authorized person authentication information storing step, and determining whether the operator is an authorized person;
a searching step of searching the usage frequency information in a case where it is determined by said determining step that the operator is an authorized person; and
a displaying step of displaying information concerning documents searched by said searching step, in an order of high usage frequency of the documents.

16. A computer readable media according to claim 15, wherein:
said document storing step stores a level of the documents;
said authorized person authentication information storing step stores a level of authorized persons;
said determining step obtains a level of an operator, in a case where it is determined that the operator is a legitimate authorized person; and
said searching step searches information of documents having a level corresponding to the level of the operator, obtained by the determining step.

17. The computer readable recording medium according to claim 15, wherein the program for controlling a computer further controls the computer to execute:
receiving a user selection of a type of document,
wherein the displaying displays the information concerning the documents in accordance with the user selection of the type of document such that only one of copied documents, scanner read documents, and e-mail documents are displayed by the displaying step.

* * * * *